Aug. 17, 1948.  F. E. BACHMAN  2,447,305
SNUBBER
Filed Jan. 10, 1944  3 Sheets-Sheet 2
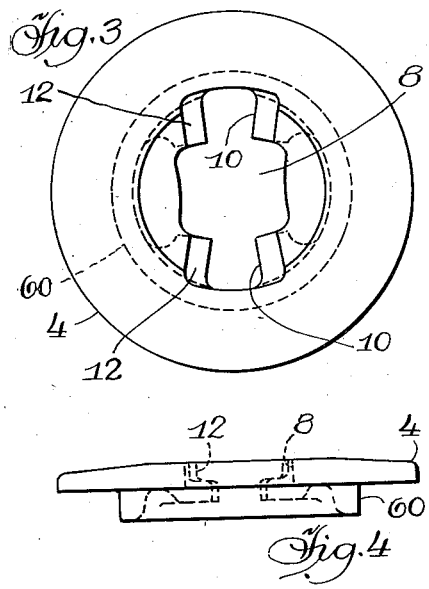
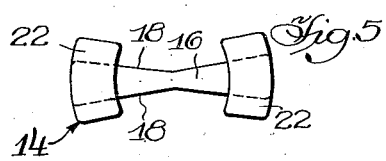
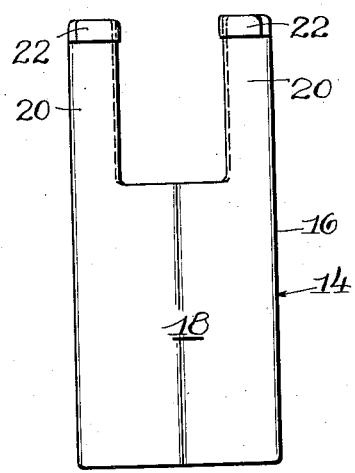
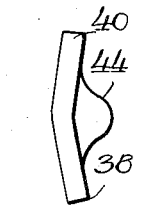
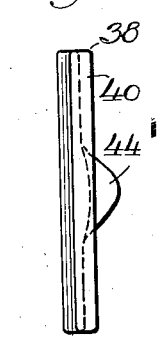
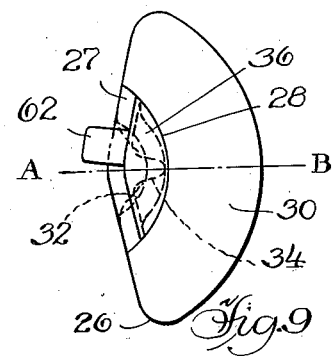
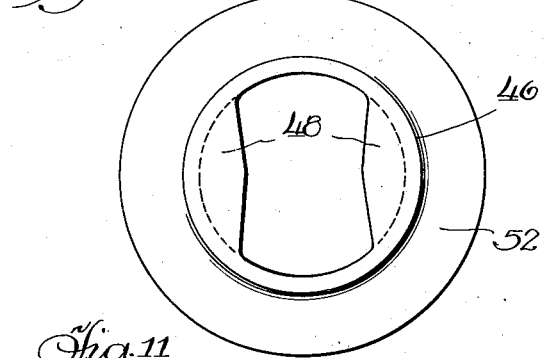
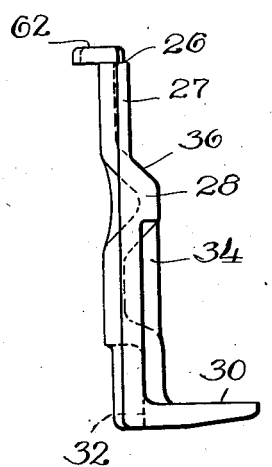
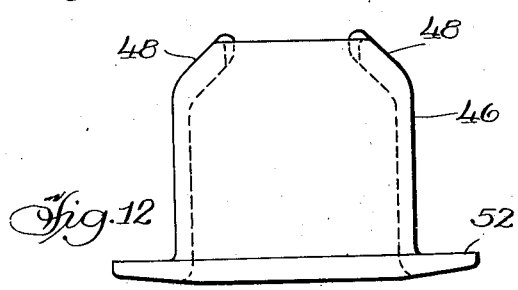
INVENTOR.
Fred E. Bachman
BY
Atty.

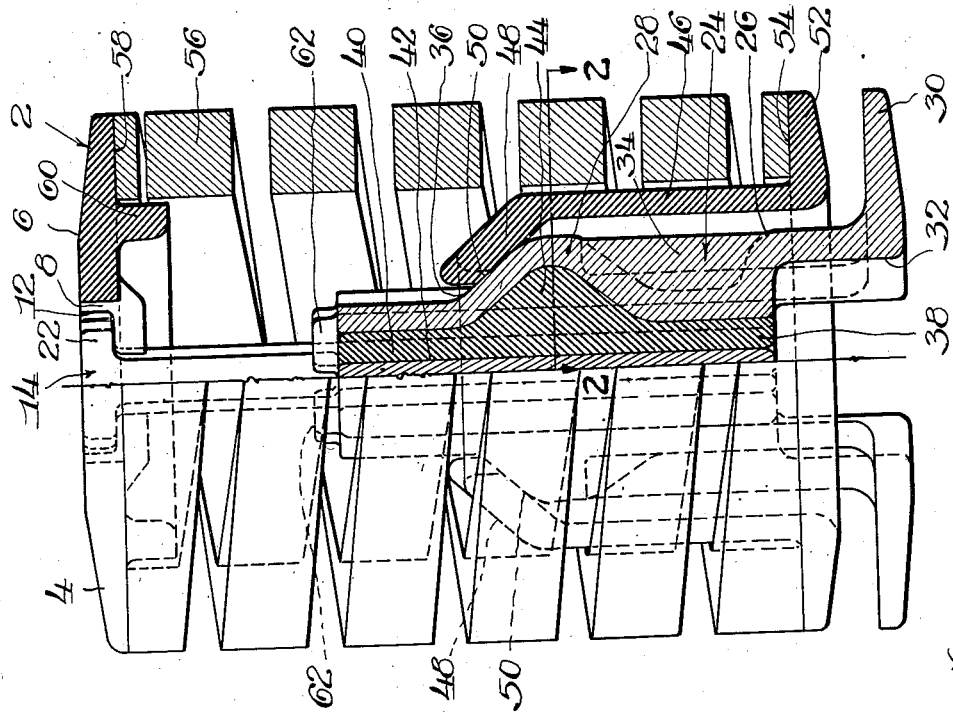

Aug. 17, 1948.　　　　F. E. BACHMAN　　　　2,447,305
SNUBBER
Filed Jan. 10, 1944　　　　　　　　　　　3 Sheets-Sheet 3

INVENTOR.
Fred E. Bachman
BY
　　　　　Atty

Patented Aug. 17, 1948

2,447,305

UNITED STATES PATENT OFFICE 2,447,305

SNUBBER

Fred E. Bachman, Chicago, Ill., assignor to American Steel Foundries, Chicago, Ill., a corporation of New Jersey Application January 10, 1944, Serial No. 517,676

18 Claims. (Cl. 267—9)

1

My invention relates to friction devices and more particularly to a snubber, such as is commonly utilized in conjunction with the bolster supporting springs of a railway car truck.

The general object of my invention is to design a snubber comprising a top follower with a slotted friction stem, friction shoes engaging said stem, an annular wedge member sleeved over said shoes in complementary wedge engagement therewith, and a spring compressed between said annular member and the top follower.

A specific object of my invention is to provide lugs on the friction shoes reciprocal within the slot through the friction stem and cooperating therewith to limit the expansion stroke of the device.

Another object of my invention is to form the friction shoes with base flanges affording a seat for the snubber against an associated supporting or supported member.

A different object of my invention is to design a snubber, such as above described, in which the friction stem is separable from the base or spring cap of its associated follower, whereby the base and stem may be formed of different materials, if desired.

Still another object of my invention is to provide a composite friction shoe having a support element of iron or steel and a complementary friction element removably mounted on said support element, said friction element being formed of metallic or nonmetallic composition, or a combination of both, as desired.

In the drawings,

Figure 1 is a side elevation of my novel snubber, the right half of the structure being shown in section along the plane indicated by the line 1—1 of Figure 2.

Figure 2 is a composite view, the left half thereof being a top plan view and the right half thereof being a sectional view taken in the plane indicated by the line 2—2 of Figure 1.

Figures 3 and 4 illustrate in detail the base portion or spring cap of the top follower shown in Figures 1 and 2, Figure 3 being a top plan view of the spring cap and Figure 4 being a side elevation thereof.

Figures 5 and 6 are, respectively, a top plan view and a side elevation of the friction stem shown in Figures 1 and 2.

Figures 7 and 8 are, respectively, a top plan view and a side elevation of the friction element of one of my novel friction shoes.

Figures 9 and 10 are, respectively, a top plan

2 view and a side elevation of the friction shoe support element.

Figures 11 and 12 are, respectively, a top plan view and a side elevation of the spring support wedge member shown in Figures 1 and 2.

Figure 13:
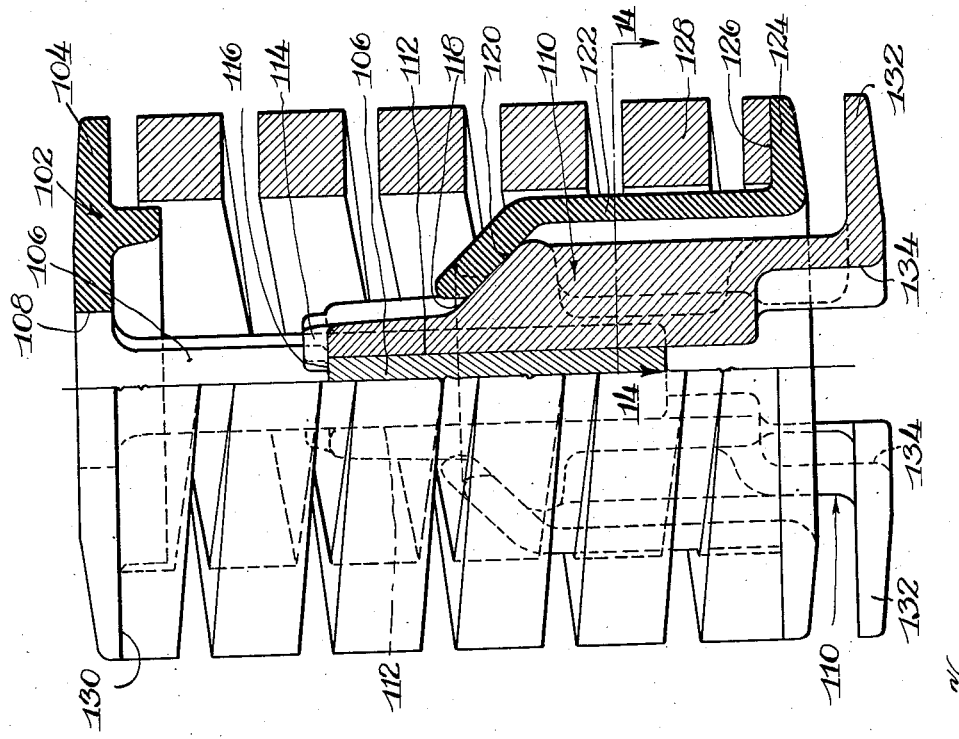
Figure 14:
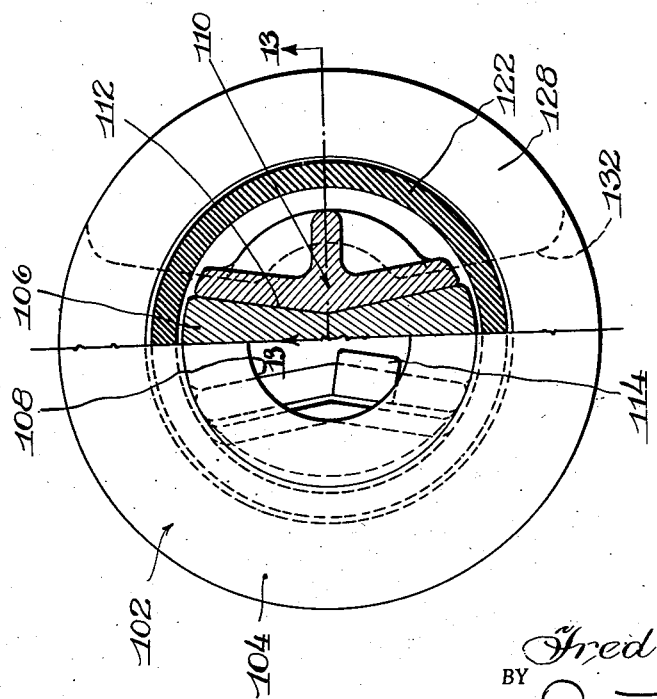

Figures 13 and 14 illustrate a modification of my invention, Figure 13 being a composite view comparable to Figure 1, the left half of Figure 13 being a side elevation and the right half thereof being a sectional view taken in the plane indicated by the line 13—13 of Figure 14. Figure 14 is a composite view, the left half thereof being a top plan view and the right half thereof being a sectional view taken in the plane indicated by the line 14—14 of Figure 13.

Describing my invention in detail and referring first to the embodiment thereof illustrated in Figures 1 to 12 inclusive, the top follower generally designated 2 comprises the annular base or spring cap member 4, affording a seat at 6 (Figure 1) for an associated supported member, such as a spring plate. The base 4 comprises a central opening 8 therethrough, merging with slots 10, 10 (Figure 3), which extend into opposed recesses 12, 12 in the top of the base 4, the opening 8 being adapted for reception of positioning means, such as a boss or a lug, on the associated supported member, as will be clearly apparent to those skilled in the art.

The friction stem generally designated 14 comprises a body portion 16 (Figures 5 and 6) presenting at opposite sides thereof V-shaped friction faces 18, 18 for complementary engagement with the associated friction shoes, as hereinafter more fully described. Projecting upwardly from the body portion 16 of the stem are the spaced arms 20, 20 (Figure 6), which extend through the slots 10, 10 of the base and comprise at their upper extremities the interlocking lugs 22, 22, which are complementary to the recesses 12, 12 of the base and are received therewithin to afford an interlock between the stem 14 and the base 4.

Each friction shoe generally designated 24 is a composite structure comprising a support member 26 illustrated in detail in Figures 9 and 10. The member 26 comprises the main vertical wall 27 of V-shape, said wall being formed intermediate its ends with a hollow projection 28 and being formed at its lower extremities with a base flange 30 affording a seat for the snubber upon the associated supporting member, such as a spring plate, the lower extremities of the wall 27 being formed with an arcuate recess 32, as best seen in the right half of Figure 1, for the reception of positioning means, such as a boss or a lug, on said supporting member. The hollow projection 28 is reinforced by a vertical rib 34 and is formed on its upper surface with a wedge face 36 for cooperation with the associated spring support wedge member, as hereinafter described.

The friction shoe 24 also comprises a friction member 38, illustrated in detail in Figures 7 and 8, and preferably formed of composition material, said element being removably mounted on the support element 26 of the friction shoe, as hereinafter described. It may be noted that the friction element 38 may be formed of any suitable metallic or nonmetallic composition, or a combination of both, in order to obtain the desired frictional characteristics, and, in this connection, it may also be noted that the friction stem 14 of the top follower is preferably formed of noncorrosive material, such as stainless steel, in order to prevent excessive abrasion of the composition friction element 38, which might result from corrosion or rusting of the friction stem under service conditions.

The friction element 38, as will be clearly understood from a consideration of Figures 7 and 8, is a substantially solid member comprising the V-shaped friction wall 40 complementary to the wall 27 of the support element 26, said wall 40 being in complementary frictional engagement at 42 (Figure 1) with the adjacent face 18 of the top follower stem 14. Intermediate its upper and lower extremities the wall 40 of the friction element 38 is formed with a complementary lug or projection 44 recessed within the hollow projection 28 of the support element 26 to afford an interlocking engagement therewith.

The annular spring support member 46 is illustrated in detail in Figures 11 and 12 and comprises at opposite sides thereof the spaced inturned diagonal lugs 48, 48 in complementary wedge engagement at 50, 50 with the wedge faces 36, 36 of the friction shoes 24, 24, and the lower extremity of the member 46 comprises an annular flange 52 affording a seat at 54 for the lower end of the coil spring 56, which is seated at its upper end as at 58 against the base or spring cap 4 and is positioned by the depending annular flange 60 thereon.

It will be understood that, while the spring 56 is illustrated as formed of a bar having a square cross-section, if desired the spring may be formed of a bar having any desired cross-section, such as, for example, circular.

The expansion stroke of the device is limited by lugs 62, 62 formed on the upper extremities of the support members 26, 26 of the friction shoes 24, 24, said lugs being received between the spaced arms 20, 20 of the friction stem 14 and being adapted to abut the upper edge of the body portion 18 thereof for limiting relative upward movement of the top follower 2 with respect to the friction shoes 24, 24, and it may be noted that each lug 62 is disposed at one side of the longitudinal center line of the support member 26, said center line being indicated at A—B in Figure 9. By virtue of this arrangement, the lugs 62, 62 of the respective shoes 24, 24 are in misalignment, thus affording clearance between the lugs 62, 62 as wear takes place at 42 between the stem 14 and the friction elements 44, 44 of the respective shoes. It will be understood that the support members 26, 26 are identical, thus interchangeable.

Referring now to the modification of my invention illustrated in Figures 13 and 14, the top follower, generally designated 102, comprises the base or spring cap 104 and the integral depending friction stem 106, said base 104 having the central opening 108 therethrough for the reception of positioning means on the associated supported member.

The friction shoes, generally designated 110, 110, are in frictional engagement at 112, 112 with the friction stem 106, each shoe comprising a lug 114 at its upper extremity for cooperation as at 116 (Figure 13) with the stem 106 intermediate the spaced arms thereof for limiting the expansion stroke of the device. Intermediate its extremities, each shoe is provided with a diagonal wedge face 118 in complementary wedge engagement at 120 with the spring support member 122, which is sleeved over the shoes and comprises the annular spring seat flange 124, affording a seat as at 126 for the lower end of the coil spring 128, the upper extremity of which is seated at 130 against the base or spring cap 104 of the top follower 102.

The lower extremities of the shoes 110, 110 are provided with the base flanges 132, 132 affording a seat for the snubber upon the associated supporting member, such as a spring plate, said shoes being provided with the arcuate recesses 134, 134 for the reception of positioning means on the supporting member.

It will be understood that the modification illustrated in Figures 13 and 14 is substantially identical with that illustrated in Figures 1 and 2, except for the fact that the spaced arms of the friction stem 106 are integral with the base or spring cap 104 of the top follower 102. Also in the embodiment illustrated in Figures 13 and 14, each friction shoe 110 is a single integral member of forged or cast iron or steel, whereas in Figures 1 and 2, as above described, each friction shoe 24 is a two-piece composite structure.

It may be noted that in either of the described embodiments of my invention, the snubber may be inverted, so that the top follower 2 or 102 becomes a bottom follower and the friction shoes 24, 24 or 110, 110 afford a seat for an associated supported member upon the snubber, and it may also be noted that, if desired, any suitable resilient member, such as a rubber sleeve, may be substituted for the coil spring illustrated.

It is to be understood that I do not wish to be limited by the exact embodiments of the device shown which are merely by way of illustration and not limitation as various and other forms of the device will, of course, be apparent to those skilled in the art without departing from the spirit of the invention or the scope of the claims.

I claim:

1. In a snubber, a top follower comprising a base with spaced recesses in the top thereof, a central opening through said base merging with slots extending into respective recesses, a stem having spaced arms extending upwardly through respective slots, each arm having a complementary lug received within the associated recess for interlocking engagement with said base, a pair of spaced friction shoes each comprising a support element having a main wall with a hollow projection presenting an external wedge face, and a removable friction element associated with said support element and having a complementary lug recessed within the hollow projection thereof, said friction element being in frictional engagement with one side of said stem, a lug on each support element overlying the associated friction element and received between said spaced arms for cooperation with a portion of said stem to limit the expansion stroke of the snubber, a spring support member sleeved over said shoes in complementary wedge engagement with said wedge faces, and a spring compressed between a flange on said spring support member and an aligned portion of said base, each of said support elements comprising a base flange affording a seat for the snubber against an associated supporting member.

2. In a snubber, a top follower comprising a base with spaced recesses in the top thereof, a central opening through said base merging with slots extending into respective recesses, a stem having spaced arms extending upwardly through respective slots, each arm having a complementary lug received within the associated recess for interlocking engagement with said base, a pair of spaced friction shoes each comprising a support element having a main wall with a hollow projection presenting an external wedge face, and a removable friction element associated with said support element and having a complementary lug recessed within the hollow projection thereof, said friction element being in frictional engagement with one side of said stem, a lug on each support element overlying the associated friction element and received between said spaced arms for cooperation with a portion of said stem to limit the expansion stroke of the snubber, a spring support member sleeved over said shoes in complementary wedge engagement with said wedge faces, and a spring compressed between a flange on said spring support member and an aligned portion of said base.

3. In a snubber, a follower comprising a base and a friction stem with a body portion and spaced integral arms extending therefrom, said arms being operatively associated with said base for movement therewith, V-shaped friction surfaces on opposite sides of said body portion, a pair of identical friction shoes, each comprising a base flange on its outer extremity affording a seat for the snubber against an associated supporting or supported member, a V-shaped friction face on each shoe engaging the associated surface, a lug on the inner extremity of each shoe reciprocal between said arms and cooperating with the body portion of the stem to limit the expansion stroke of the snubber, an annular spring support member sleeved over said shoes in diagonal wedge face engagement therewith, said support member having an annular spring seat flange, and a coil spring sleeved over said support member, one end of said spring bearing against said flange and the opposite end of said spring bearing against said base, the lug on each shoe being entirely disposed at one side of the longitudinal center line thereof.

4. In a snubber, a top follower comprising a base portion and a friction stem with a body portion, and spaced arms extending upwardly therefrom and connected to said base portion, a pair of spaced friction shoes each frictionally engaging said body portion and each comprising a base flange affording a seat for the snubber against an associated member, a projection on each shoe presenting a wedge face, a spring support member sleeved over said shoes in complementary wedge engagement with said faces, said support member presenting an annular spring seat flange, resilient means sleeved over said support member and compressed against said spring seat flange and against an aligned surface on said base portion, and a lug on each shoe received between said spaced arms for cooperation with the upper edge of said body portion to limit the expansion stroke of the snubber, the lugs on respective shoes being misaligned to afford clearance therebetween as wear takes place between said shoes and the associated surfaces of said body portion.

5. In a snubber, a follower comprising a base and a friction stem with a body portion and spaced integral arms extending therefrom, said arms being operatively associated with said base for movement therewith, V-shaped friction surfaces on opposite sides of said body portion, a pair of friction shoes, each comprising a base flange on its outer extremity affording a seat for the snubber against an associated supporting or supported member, a V-shaped friction face on each shoe engaging the associated surface, a lug on the inner extremity of each shoe reciprocal between said arms and cooperating with the body portion of the stem to limit the expansion stroke of the snubber, an annular spring support member sleeved over said shoes in diagonal wedge face engagement therewith, said support member having an annular spring seat flange, and a coil spring sleeved over said support member, one end of said spring bearing against said flange and the opposite end of said spring bearing against said base.

6. In a snubber, a top follower comprising a base portion and a friction stem with a body portion, and spaced arms extending upwardly therefrom and connected to said base portion, a pair of spaced friction shoes each frictionally engaging said body portion and each comprising a base flange affording a seat for the snubber against an associated member, a projection on each shoe presenting a wedge face, a spring support member sleeved over said shoes in complementary wedge engagement with said faces, said support member presenting an annular spring seat flange, resilient means sleeved over said support member and compressed against said spring seat flange and against an aligned surface on said base portion, and a lug on each shoe received between said spaced arms for cooperation with the upper edge of said body portion to limit the expansion stroke of the snubber.

7. In a snubber, a follower comprising a base and a removable friction stem with spaced arms interlocked therewith, said base affording a seat for one end of the snubber, a plurality of friction shoe members affording a seat for the snubber at the opposite end thereof, each of said members comprising a wedge face, a spring support element sleeved over said members in wedge engagement with said faces, resilient means compressed between said element and said base, a removable friction element of composition material associated with each shoe member and comprising a positioning lug recessed therein for interlocking said element therewith, said element being frictionally engaged with said stem, and a lug on each shoe member bearing against one end of the associated element and extending between said arms for engagement with said stem to limit the expansion stroke of the snubber.

8. In a snubber, a follower comprising a base and a removable friction stem interlocked therewith, said base affording a seat for one end of the snubber, a plurality of friction shoe members movable relative to said follower and affording a seat for the snubber at the opposite end thereof, each of said members comprising a wedge face, a spring support element sleeved over said face, a spring support element sleeved over said members in wedge engagement with said faces, resilient means compressed between said element and said base, friction means entirely between and removably supported on said shoe members and engaging said stem, lugs on the inner extremities of said shoe members received within an opening in said stem and cooperating therewith for limiting the expansion stroke of the snubber and having engagement with said friction means for preventing relative movement of said friction means and shoe members during relative movement of said shoe members and said follower.

9. In a snubber, a follower comprising a base and a friction stem movable therewith, said base affording a seat for one end of the snubber, friction shoes engaging said stem and affording a seat for the snubber at the opposite end thereof, each shoe comprising a wedge face, a member sleeved over said shoes and in complementary wedge engagement with said wedge faces, resilient means compressed between said member and said base, each of said shoes being a composite member comprising a support element and a friction element seated thereon, each of said friction elements being maintained tightly against said stem and the associated support element solely by pressure exerted by said resilient means, and a projection on each element at one extremity thereof extending within a slot in said stem and cooperating therewith for limiting the expansion stroke of the snubber and engaging the adjacent element to prevent relative movement of the latter with respect to the associated support element and said follower during relative movement of said shoes and follower.

10. In a snubber, a follower comprising a base and a removable friction stem interlocked therewith, said base affording a seat for one end of the snubber, a plurality of friction shoe members affording a seat for the snubber at the opposite end thereof, each of said members comprising a wedge face, a spring support element sleeved over said members in wedge engagement with said faces, resilient means compressed between said element and said base, removable friction elements mounted on said shoe members and frictionally engaging said stem, and means on each shoe member at one extremity thereof engaging the associated element for support thereof and extending within a slot in said stem for limiting the expansion stroke of the snubber.

11. In a friction device, a follower comprising a base and a friction stem, friction shoes associated with said stem and each comprising a base flange affording a seat for the snubber at one end thereof, wedge means sleeved over said shoes in complementary wedge engagement therewith, resilient means sleeved over said wedge means and bearing thereagainst and against said follower, and lugs on said shoes reciprocal within an opening through said stem and cooperating therewith for limiting the expansion stroke of the device, each of said shoes comprising a support element and a removable friction element engaged thereby and engaging said stem, each of said lugs having engagement with the adjacent friction element for support thereof.

12. In a friction shoe support element, a member having a main wall, with a base flange formed at one extremity of said wall and projecting from one side thereof, an interlocking lug on the opposite extremity of said wall projecting from the opposite side thereof, and a hollow projection on said wall formed intermediate said extremities for supporting an associated friction shoe, said projection presenting an external wedge face on the first-mentioned side of said wall, said lug being entirely disposed at one side of the longitudinal center line of said wall.

13. In a snubber, a follower comprising a base and a friction stem removably interlocked therewith, said stem being formed of a noncorrosive metal, friction shoes each comprising a wedge face, a member sleeved over said shoes in complementary engagement with said wedge faces, resilient means compressed between said member and said base, each of said shoes being a composite structure comprising a support element and a composition friction element thereon in frictional engagement with said stem, each friction element being held in engagement with the associated support element by pressure exerted by said resilient means, and means associated with each support element in engagement with the associated friction element for preventing relative movement between the same and having interlocking engagement with said stem for limiting the expansion stroke of said snubber.

14. In a snubber, a follower comprising a friction stem, said follower affording a seat for one end of the snubber, a plurality of friction shoe members affording a seat for the snubber at the opposite end thereof, a spring support element sleeved over said members in wedge engagement therewith, resilient means compressed between said element and said follower, and friction means comprising nonmetallic friction elements removably supported by and between said shoe members and engaging said stem, each of said friction means being held in engagement with the associated shoe member by pressure exerted by said resilient means, and means comprising lugs extending in a plane normal to the plane of said friction stem associated with each shoe member in engagement with the associated friction means for preventing relative movement between the same and having interlocking engagement with said stem for limiting the expansion stroke of said snubber.

15. In a friction device, a follower comprising a base and a friction stem, friction shoes engaged with said stem and each having a bipartite structure comprising a support element and friction means seated thereagainst and against said friction stem, wedge means sleeved over said shoes in complementary wedge engagement therewith, resilient means sleeved over said wedge means and bearing thereagainst and against said base, and a lug on each support element reciprocal within an opening through said stem and cooperating therewith for limiting the expansion stroke of the device and also having engagement with the associated friction means for retaining the same against movement relative to the associated support element during relative linear movement between said shoes and said follower.

16. In a friction shoe support element, a member having a main wall, a base flange formed at one extremity of said main wall and projecting from one side thereof, an interlocking lug on the opposite extremity of said wall projecting from the opposite side thereof, a hollow projection on said wall intermediate said lug and base flange and projecting from said wall in the same direction as said base flange, said hollow projection being adapted to afford a support for an associated friction element, a reinforcing rib for said projection on said wall extending longitudinally thereof and disposed between said projection and base flange and merging with said projection, and a wedge face on said projection on a side thereof remote from said rib.

17. In a snubber, a top follower comprising a base with spaced recesses in the top thereof, a central opening through said base merging with slots extending into respective recesses, a stem having spaced arms extending upwardly through respective slots, each arm having a complementary lug received within the associated recess for interlocking engagement with said base, a pair of spaced friction shoes each comprising a support element having a main wall with a hollow projection presenting an external wedge face, and a removable friction element associated with said support element and having a complementary lug recessed within the hollow projection thereof, said friction element being in frictional engagement with one side of said stem, a lug on each support element overlying the associated friction element and received between said spaced arms for cooperation with a portion of said stem to limit the expansion stroke of the snubber, a spring support member in complementary wedge engagement with said wedge faces, and a spring compressed between a flange on said spring support member and an aligned portion of said base.

18. In a snubber, a follower comprising a base and a friction stem, a pair of spaced friction shoe members each comprising a base affording a seat for the snubber against an associated member, a projection on each shoe member presenting a wedge face on one side thereof, a spring support member sleeved over said shoe members in complementary wedge engagement with said faces, resilient means sleeved over said support member and compressed between said member and an aligned surface on said first-mentioned base, and removable friction elements engaged with said shoe members on the opposite side thereof and frictionally engaging said stem, each friction element being maintained in engagement with the associated shoe member and said stem by the pressure transmitted to said elements and shoe members by said resilient means, and common means supporting each element on its associated shoe member for movement therewith relative to said stem and having interlocking engagement with said stem to limit the expansion stroke of the snubber.

FRED E. BACHMAN.

REFERENCES CITED

The following references are of record in the file of this patent:

UNITED STATES PATENTS

| Number | Name | Date |
| --- | --- | --- |
| 629,110 | McCord | July 18, 1899 |
| 1,292,539 | Todd | Jan. 28, 1919 |
| 1,674,824 | Haseltine | June 26, 1928 |
| 1,679,921 | Sherman et al. | Aug. 7, 1928 |
| 1,688,649 | O'Connor | Oct. 23, 1928 |
| 1,907,068 | Haseltine | May 2, 1933 |
| 1,935,796 | Haseltine | Nov. 21, 1933 |
| 1,989,157 | Schmidt | Jan. 29, 1935 |
| 2,004,829 | Ragsdale | June 11, 1935 |
| 2,084,638 | Goodwin | June 22, 1937 |
| 2,123,702 | Lerch | July 12, 1938 |
| 2,128,504 | Sproul | Aug. 30, 1938 |
| 2,223,656 | Bachman | Dec. 3, 1940 |
| 2,277,263 | Tucker | Mar. 24, 1942 |
| 2,373,508 | Snyder | Apr. 10, 1945 |

FOREIGN PATENTS

| Number | Country | Date |
| --- | --- | --- |
| 4,120 | Great Britain | Feb. 15, 1914 |